United States Patent
Hasegawa

(10) Patent No.: US 7,848,735 B2
(45) Date of Patent: Dec. 7, 2010

(54) COMMUNICATION CONTROL APPARATUS, METHOD OF CONTROLLING SENDER TERMINAL NUMBER, AND COMPUTER PRODUCT

(75) Inventor: Naoto Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1036 days.

(21) Appl. No.: 11/386,684

(22) Filed: Mar. 23, 2006

(65) Prior Publication Data

US 2007/0149169 A1  Jun. 28, 2007

(30) Foreign Application Priority Data

Dec. 27, 2005 (JP) .............................. 2005-376078

(51) Int. Cl.
*H04M 11/00* (2006.01)
(52) U.S. Cl. .................................. 455/406; 379/121.02
(58) Field of Classification Search ................. 455/406, 455/412.1, 412.2, 415, 417; 379/121.01, 379/121.02, 120, 211.01, 211.02
See application file for complete search history.

(56) References Cited

U.S. PATENT DOCUMENTS

2002/0061740 A1 * 5/2002 Lautenschlager et al. ... 455/406

FOREIGN PATENT DOCUMENTS

| JP | 10-322479 | 12/1998 |
| JP | 11-136387 | 5/1999 |
| JP | 2001-119482 | 4/2001 |
| JP | 2002-209239 | 7/2002 |
| JP | 2003-125081 | 4/2003 |
| JP | 2004-040482 | 2/2004 |

OTHER PUBLICATIONS

Japanese Office Action for corresponding Japanese Application 2005-376078; mailed Mar. 2, 2010.

* cited by examiner

*Primary Examiner*—Nay A Maung
*Assistant Examiner*—Angelica M Perez
(74) *Attorney, Agent, or Firm*—Staas & Halsey LLP

(57) ABSTRACT

A transmission-request control unit controls a first transmission request in which a third communication terminal is designated as a receiver with a terminal number of a first communication terminal as a sender terminal number, and controls a second transmission request including the first transmission request and a transmission request in which a second communication terminal is designated as a sender with a terminal number of the second communication terminal as the sender terminal number by acquiring the terminal number of the second communication terminal corresponding to the first communication terminal from a terminal-number storing unit.

10 Claims, 11 Drawing Sheets

FIG.4

| ID | LOCAL TELEPHONE NUMBER | TRANSMISSION TELEPHONE NUMBER |
|---|---|---|
| 1 | 09012345678 | 0311112222 |
| 2 | 09011112222 | 0322223333 |
| ⋮ | ⋮ | ⋮ |

FIG.5

| ID | TRANSMISSION TELEPHONE NUMBER | LOCAL TELEPHONE NUMBER | CALL CHARGE |
|---|---|---|---|
| 1 | 0311112222 | 09012345678 | 5000 |
| 2 | 0322223333 | 09011112222 | 1000 |
| ⋮ | ⋮ | ⋮ | ⋮ |

FIG.9

| ID | LOCAL TELEPHONE NUMBER | TRANSMISSION TELEPHONE NUMBER | UNIQUE ID |
|---|---|---|---|
| 1 | 09012345678 | 0311112222 | 001 |
| 2 | 09011112222 | 0311112222 | 002 |
| ⋮ | ⋮ | ⋮ | ⋮ |

FIG.11

| ID | LOCAL TELEPHONE NUMBER | TRANSMISSION TELEPHONE NUMBER | OPERATIONAL PERIOD | ACCESSIBLE HOURS |
|---|---|---|---|---|
| 1 | 09012345678 | 0311112222 | 2005/12/30 13:00 - 2006/12/30 13:00 | 07:00 - 17:30 |
| 2 | 09011112222 | 0322223333 | 2005/12/30 13:00 - 2006/12/30 13:00 | 07:00 - 17:30 |
| ... | ... | ... | ... | ... |

COMMUNICATION CONTROL APPARATUS, METHOD OF CONTROLLING SENDER TERMINAL NUMBER, AND COMPUTER PRODUCT

BACKGROUND OF THE INVENTION

1. Field of the Invention

The present invention relates to a communication control apparatus, a method of controlling a sender terminal number, and a computer product for controlling a transmission request from a communication terminal and a communication charge for the transmission request.

2. Description of the Related Art

Recently, with development of network environment at ordinary households and popularization of Small Office Home Office (SOHO) as a backdrop, a working style such as working at home other than a company office becomes popular. In such working style, a telephone terminal for business use and a telephone terminal for personal use are generally used separately according to a time, a place, and an occasion. However, there is a management cost problem because of possession of a plurality of telephone terminals.

There is a technology that allows a telephone terminal to be used for business use and personal use in a distinguished way. For example, according to Japanese Patent Laid-open Publication H10-322479, a telephone number of the other side to be connected as business use is registered on a telephone terminal. When a receiver telephone number of a calling request received from the telephone terminal is a registered telephone number, a call charge for the calling request is to be billed as business use (billing to company). On the other hand, when the receiver telephone number of the calling request received from the telephone terminal is not registered in advance, the call charge for the calling request is to be billed as personal use (billing to an individual).

However, the conventional technology described above has a problem that, when you want to contact a new counterpart as a business purpose, a telephone number of the counterpart has to be registered in advance, so that you cannot instantaneously make a transmission to an unplanned counterpart as business use. In addition, the conventional technology has a problem that, when a transmission for business use is carried out, a sender telephone number to be notified to a counterpart is a telephone number of a telephone terminal for personal use, so that personal information may be leaked.

SUMMARY OF THE INVENTION

It is an object of the present invention to at least solve the problems in the conventional technology.

A communication control apparatus according to one aspect of the present invention includes a terminal-number storing unit that stores a first terminal number of a first communication terminal and a second terminal number of a second communication terminal in a corresponding manner; a transmission-request receiving unit that receives, from the first communication terminal, a first transmission request in which a third terminal number of a third communication terminal is designated as a receiver terminal number, or a second transmission request including the first transmission request and a transmission request in which the second terminal number is designated as a sender terminal number; and a transmission-request control unit that controls the first transmission request with the first terminal number as the sender terminal number upon receiving the first transmission request, and controls the second transmission request with the second terminal number as the sender terminal number upon receiving the second transmission request, by acquiring the second terminal number corresponding to the first communication terminal from the terminal-number storing unit.

A method of controlling a sender terminal number according to another aspect of the present invention includes storing a first terminal number of a first communication terminal and a second terminal number of a second communication terminal in a corresponding manner; receiving, from the first communication terminal, a first transmission request in which a third terminal number of a third communication terminal is designated as a receiver terminal number, or a second transmission request including the first transmission request and a transmission request in which the second terminal number is designated as the sender terminal number; and controlling including controlling the first transmission request with the first terminal number as the sender terminal number upon receiving the first transmission request, and controlling the second transmission request with the second terminal number as the sender terminal number upon receiving the second transmission request, by acquiring the second terminal number corresponding to the first communication terminal.

A computer-readable recording medium according to still another aspect of the present invention stores a computer program for controlling a sender terminal number. The computer program causes a computer to execute storing a first terminal number of a first communication terminal and a second terminal number of a second communication terminal in a corresponding manner; receiving, from the first communication terminal, a first transmission request in which a third terminal number of a third communication terminal is designated as a receiver terminal number, or a second transmission request including the first transmission request and a transmission request in which the second terminal number is designated as the sender terminal number; and controlling including controlling the first transmission request with the first terminal number as the sender terminal number upon receiving the first transmission request, and controlling the second transmission request with the second terminal number as the sender terminal number upon receiving the second transmission request, by acquiring the second terminal number corresponding to the first communication terminal.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is an example of a table stored in a transmission-number management database according to the first embodiment;

FIG. 5 is an example of a table stored in a billing management database according to the first embodiment;

FIG. 9 is an example of a table stored in a transmission-number management database according to the second embodiment;

FIG. 11 is another example of a table stored in the transmission-number management database according to the second embodiment.

DETAILED DESCRIPTION OF THE PREFERRED EMBODIMENTS

Exemplary embodiments of the present invention are explained below in detail with reference to the accompanying drawings.

Figure 1:
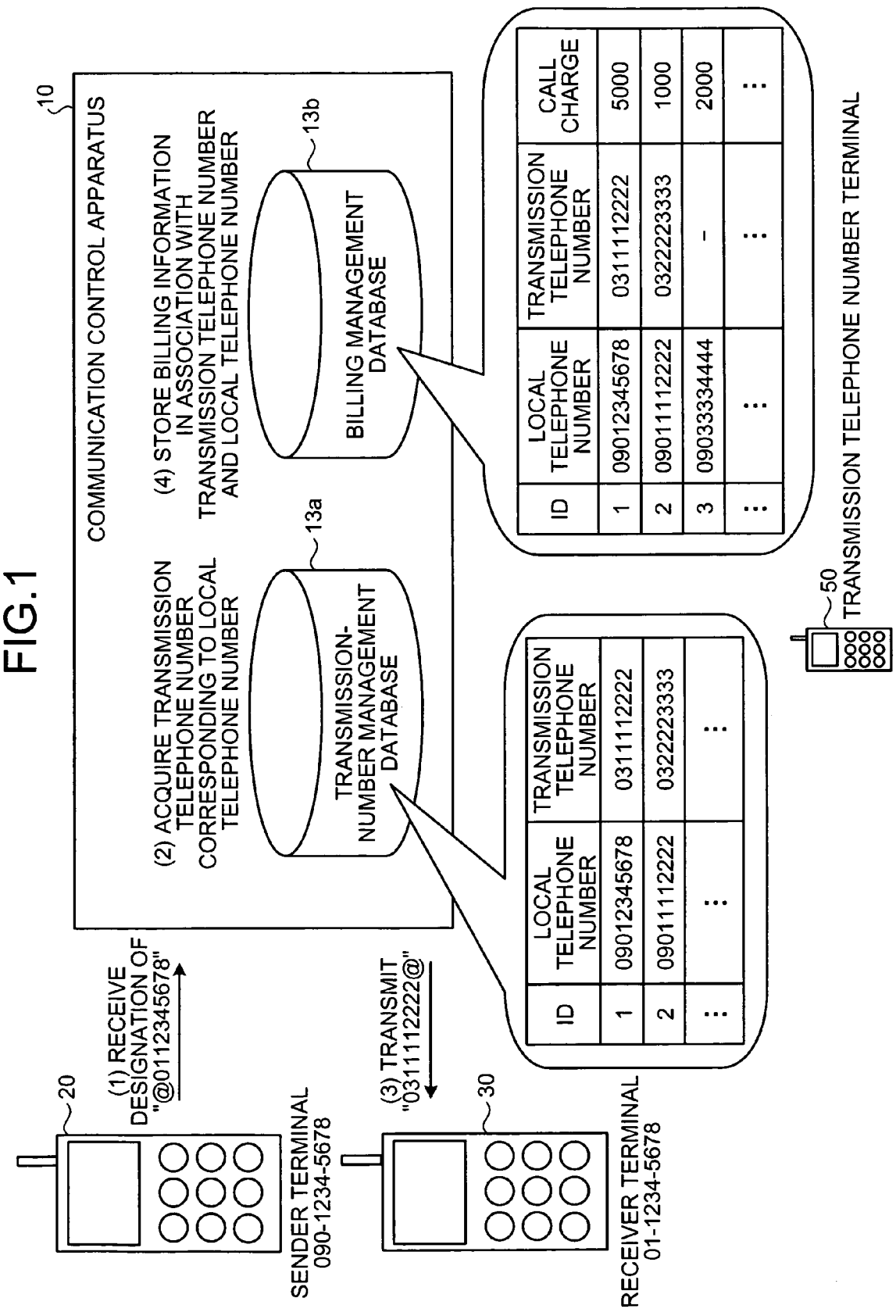
FIG. 1 is a schematic for illustrating an outline and features of a communication control apparatus according to a first embodiment of the present invention.

FIG. 1 is a schematic for illustrating an outline and features of a communication control apparatus 10 according to a first embodiment of the present invention.

The communication control apparatus 10 according to the first embodiment controls a transmission request from a sender terminal 20, and controls a communication charge for the transmission request so as to bill either the sender terminal 20 or a transmission telephone number terminal 50. With the communication control apparatus 10, principal characteristics lie in prevention of leakage of personal telephone number (s), and availability of a prompt start of operation. The sender terminal 20 corresponds to a "first communication terminal", and the transmission telephone number terminal 50 corresponds to a "second communication terminal".

The communication control apparatus 10 according to the first embodiment includes a table of a transmission-number management database 13a and a table of a billing management database 13b as shown in FIG. 1. The transmission-number management database 13a stores "ID" that denotes an individual identification number, "local telephone number" that denotes a telephone number of the sender terminal, and "transmission telephone number" that denotes a telephone number to be notified to a counterpart, by associating one another. The billing management database 13b stores the "ID", the "local telephone number", the "transmission telephone number", and "call charge" that denotes a charge to be billed to the transmission telephone number, by associating one another. The local telephone number corresponds to a "terminal number of a first communication terminal", and the transmission telephone number corresponds to a "terminal number of a second communication terminal".

When receiving only a transmission request from the sender terminal 20 to designate a telephone number of a receiver terminal 30 to be connected (for example, "0112345678"), the communication control apparatus 10 transmits directly a telephone number of the sender terminal 20 (for example, "09012345678") as a sender telephone number to the receiver terminal 30. After a call by the transmission is finished, the communication control apparatus 10 stores a call charge into the billing management database 13b by associating the call charge with a local telephone number to bill the sender terminal 20.

On the other hand, when receiving sender designation of a transmission number (for example, "@0112345678") from the sender terminal 20, which combines the transmission request and a billing request (for example, "@") to bill the transmission telephone number terminal 50 (see FIG. 1, (1)), the communication control apparatus 10 acquires a transmission telephone number from the transmission-number management database 13a based on the local telephone number of the sender terminal 20 as a searching key (see FIG. 1, (2)). For example, when receiving sender designation of a transmission number from the sender terminal 20, the communication control apparatus 10 acquires a transmission telephone number "0311112222" corresponding to the local telephone number "0901234568" from the transmission-number management database 13a.

The communication control apparatus 10 then transmits designation of the transmission telephone number for the receiver (for example, 0311112222@), which combines the transmission telephone number and a transmission telephone number character, to the receiver terminal 30 as a sender telephone number (see FIG. 1, (3)). After a call by the transmission is finished, the communication control apparatus 10 stores a call charge into the billing management database 13b by associating the call charge with the transmission telephone number and the local telephone number to bill the transmission telephone number (see FIG. 1, (4)). For the above example, the communication control apparatus 10 stores a call charge "5000" into the billing management database 13b by associating the call charge with the local telephone number "0901234568" and the transmission telephone number "0311112222".

According to the first embodiment, the telephone number of the sender terminal 20 and the telephone number of the transmission telephone number terminal 50 are stored by associating each other. From the sender terminal 20, received is a transmission request alone to designate the telephone number of the receiver terminal 30 as a receiver telephone number, or the transmission request together with a billing request to bill the transmission telephone number terminal 50. When receiving only the transmission request, the transmission request is controlled with the telephone number of the sender terminal 20 as a sender telephone number. When receiving the transmission request together with the billing request, by acquiring a stored telephone number of the transmission telephone number terminal 50 associated with the sender terminal 20, the transmission request is controlled with the telephone number of the transmission telephone number terminal 50 as a sender telephone number. The transmission request controlled with the telephone number of the sender terminal 20 as the sender telephone number is controlled so as to bill the sender terminal 20 for a communication charge for the transmission request, and the transmission request controlled with the telephone number of the transmission telephone number terminal 50 as the sender telephone number is controlled so as to bill the transmission telephone number terminal 50 for a communication charge for the transmission request. Accordingly, as a principal characteristic, the telephone number of the sender terminal 20 is not presented to a counterpart, so that leakage of personal information can be prevented. Moreover, no destination is required to be registered in advance, thereby operation of the system can be started promptly.

Figure 2:
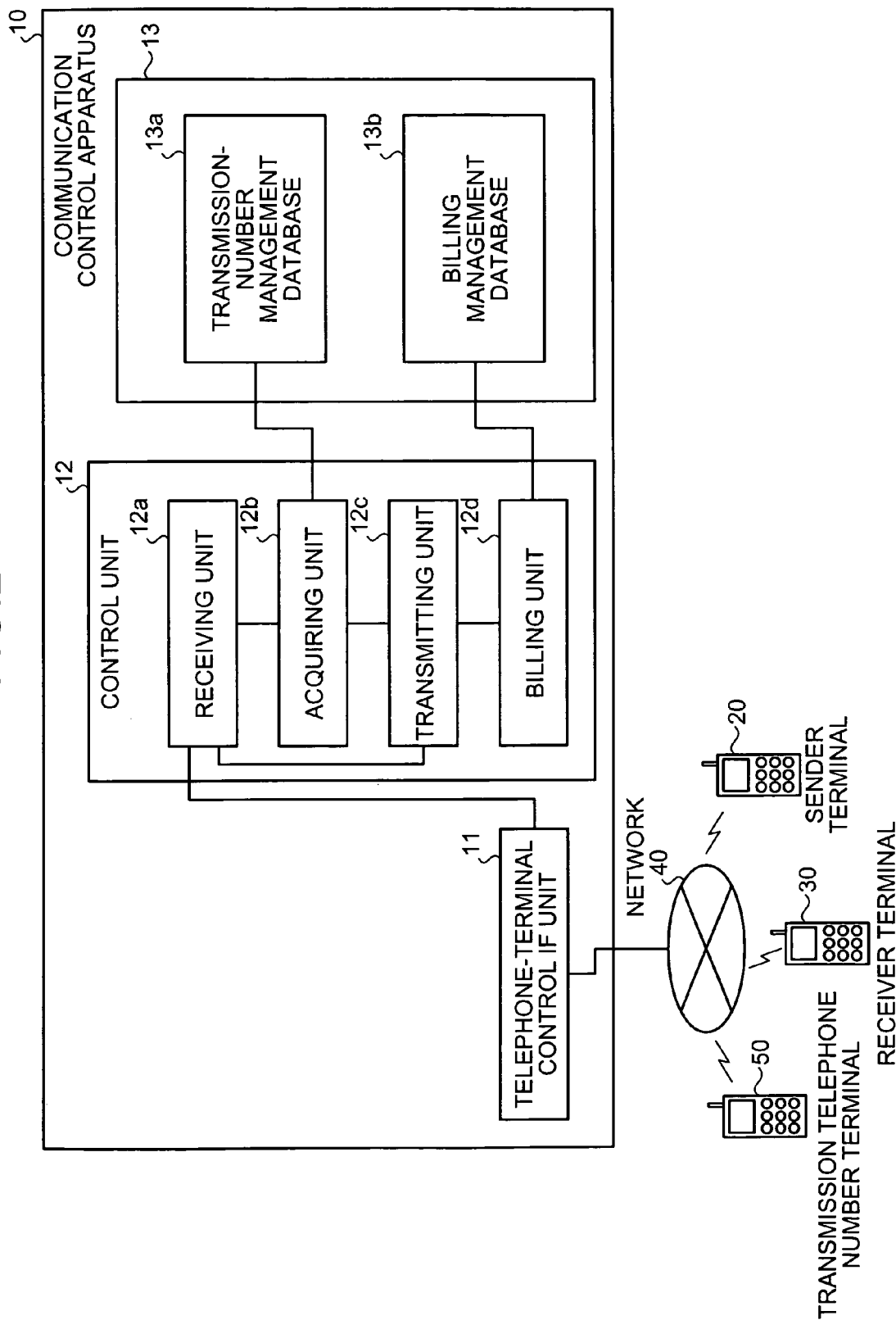
FIG. 2 is a block diagram of the communication control apparatus according to the first embodiment.

FIG. 2 is a block diagram of the communication control apparatus 10 according to the first embodiment. The communication control apparatus 10 is connected to the sender terminal 20, the receiver terminal 30, the transmission telephone number terminal 50 via a network 40.

The communication control apparatus 10 includes a telephone-terminal control IF unit 11, a control unit 12, a storing unit 13. Processing performed by theses units is explained below.

The telephone-terminal control IF unit 11 is a control unit that controls communication for information exchanged between devices (the sender terminal 20, the receiver terminal 30, and the transmission telephone number terminal 50) connected via the network 40.

The storing unit 13 is a storing unit that stores data and program(s) necessary for processing by the control unit 12. The storing unit 13 includes the transmission-number management database 13a and the billing management database 13b. The transmission-number management database 13a corresponds to a "terminal-number storing unit".

The transmission-number management database 13a is a storing unit that stores the telephone number of the sender terminal 20 and the telephone number of the transmission telephone number terminal 50 by associating one another. Specifically, as illustrated in FIG. 4, "ID" that denotes an individual identification number, "local telephone number" that denotes a telephone number of the sender terminal, and "transmission telephone number" that denotes a telephone number to be notified to a counterpart, are stored by associating one another.

The billing management database 13b is a storing unit that stores a call charge for a transmission request by associating the call charge with an account to be billed. Specifically, as illustrated in FIG. 5, the "ID", the "local telephone number", the "transmission telephone number", and "call charge" that denotes a charge to be billed to the transmission telephone number, are stored by associating one another.

The control unit 12 includes program(s) for regulating each processing procedure and an internal memory for storing necessary data, and executes various processing with the program(s) and the memory. The control unit 12 includes a receiving unit 12a, an acquiring unit 12b, a transmitting unit 12c, and a billing unit 12d. The receiving unit 12a corresponds to a "transmission-request receiving unit", the acquiring unit 12b and the transmitting unit 12c correspond to a "transmission-request control unit", and the billing unit 12d corresponds to a "billing control unit".

The receiving unit 12a receives a transmission request alone from the sender terminal 20 to designate the telephone number of the receiver terminal 30.as a receiver telephone number, or receives the transmission request together with a billing request to bill the transmission telephone number terminal 50. Specifically, from the sender terminal 20, the receiving unit 12a receives a transmission request alone to designate the telephone number of the receiver terminal 30 as a destination (for example, "0112345678"), or sender designation of a transmission number (for example, "@0112345678"), which combines the transmission request and a billing request (for example, "@") to bill the transmission telephone number terminal 50.

The acquiring unit 12b acquires the stored telephone number of the transmission telephone number terminal 50 associated with the sender terminal 20 from the transmission-number management database 13a. Specifically, when the receiving unit 12a receives sender designation of a transmission number from the sender terminal 20, the acquiring unit 12b acquires the transmission telephone number based on the local telephone number of the sender terminal 20 as a searching key from the transmission-number management database 13a. For example, when the receiving unit 12a receives sender designation of a transmission number from the sender terminal 20, the acquiring unit 12b acquires the transmission telephone number "0311112222" corresponding to the local telephone number "0901234568" from the transmission-number management database 13a.

The transmitting unit 12c controls a transmission request with the telephone number of the transmission telephone number terminal 50 as a sender telephone number. Specifically, when the receiving unit 12a receives only a transmission request (for example, "0112345678") from the sender terminal 20, the transmitting unit 12c transmits directly the telephone number of the sender terminal 20 (for example, "09012345678") as a sender telephone number to the receiver terminal 30. On the other hand, when the acquiring unit 12b acquires the transmission telephone number, the transmitting unit 12c transmits designation of the transmission telephone number for the receiver (for example, 0311112222@), which combines an acquired transmission telephone number and a transmission telephone number character, as a sender telephone number to the receiver terminal 30.

The billing unit 12d controls a transmission request controlled with the telephone number of the sender terminal 20 as a sender telephone number by the transmitting unit 12c so as to bill the sender terminal 20 for a call charge for the transmission request, and controls a transmission request controlled with the telephone number of the transmission telephone number terminal 50 as a sender telephone number by the transmitting unit 12c so as to bill the transmission telephone number terminal 50 for a call charge for the transmission request. Specifically, for the transmission request controlled with the telephone number of the sender terminal 20 as a sender telephone number, after a call by the transmission is finished, the call charge is stored into the billing management database 13b by associating the call charge with the local telephone number to bill the sender terminal 20.

On the other hand, for the transmission request controlled with the telephone number of the transmission telephone number terminal 50 as a sender telephone number by the transmitting unit 12c, after a call by the transmission is finished, the call charge is stored into the billing management database 13b by associating the call charge with the transmission telephone number and the local telephone number to bill the transmission telephone number. For example, a call charge "5000" is stored into the billing management database 13b by associating the call charge with the local telephone number "0901234568" and the transmission telephone number "0311112222".

Figure 3:
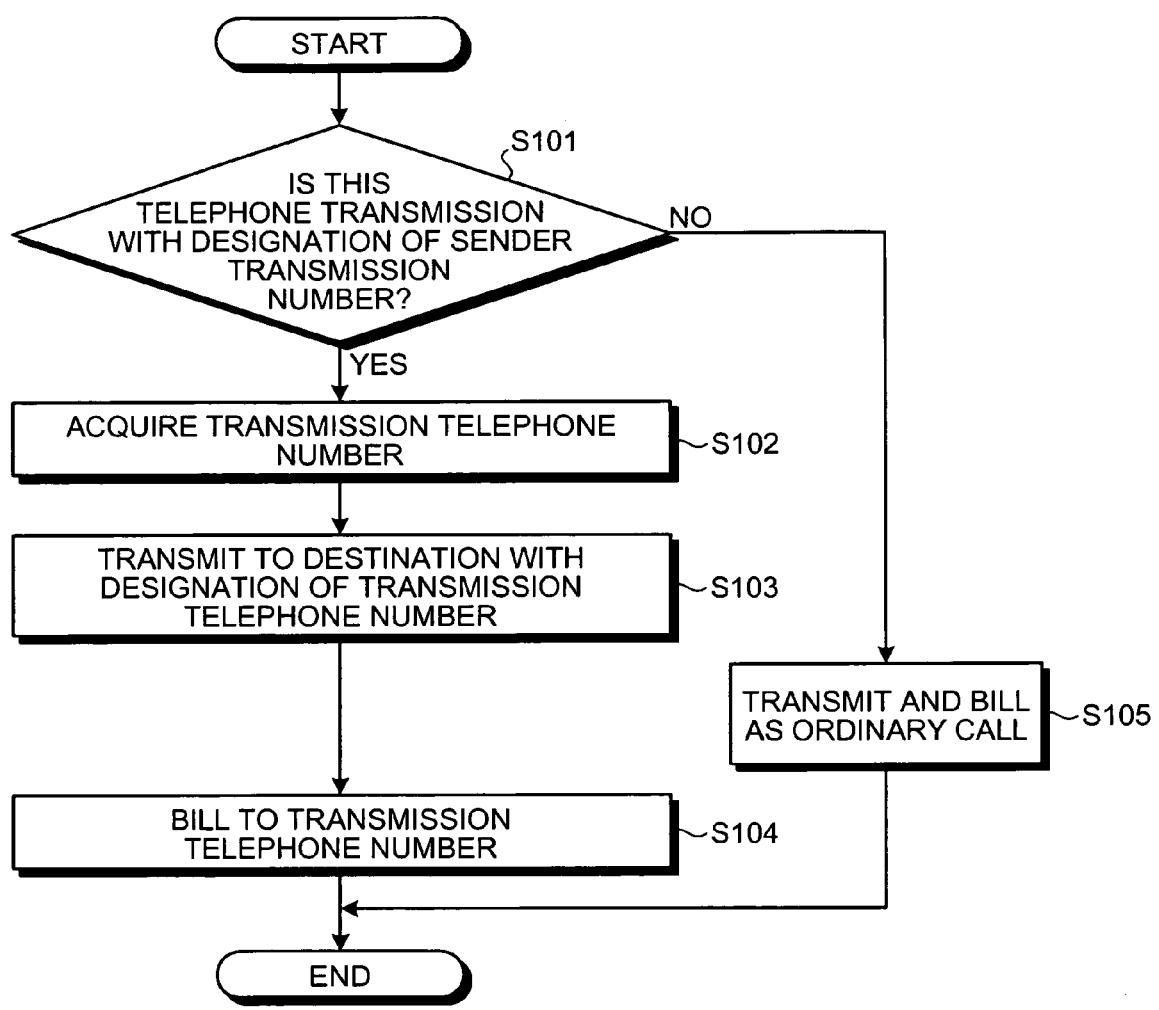
FIG. 3 is a flowchart of a processing procedure for a transmission control process according to the first embodiment.

FIG. 3 is a flowchart of a processing procedure for a transmission control process according to the first embodiment.

When the receiving unit 12a receives sender designation of a transmission number from the sender terminal 20 (step S101, Yes), the communication control apparatus 10 acquires the transmission telephone number based on the local telephone number of the sender terminal 20 as a searching key from the transmission-number management database 13a (step S102). For example, when the receiving unit 12a receives sender designation of a transmission number from the sender terminal 20, the communication control apparatus 10 acquires the transmission telephone number "0311112222" corresponding to the local telephone number "0901234568" from the transmission-number management database 13a.

When the acquiring unit 12b acquires the transmission telephone number, designation of the transmission telephone number for the receiver (for example, 0311112222@), which combines an acquired transmission telephone number and a transmission telephone number character, is transmitted as a sender telephone number to the receiver terminal 30 (step S103). For the transmission request controlled with the telephone number of the transmission telephone number terminal 50 as a sender telephone number by the transmitting unit 12c, after a call by the transmission is finished, a call charge is stored into the billing management database 13b by associating the call charge with the transmission telephone number and the local telephone number to bill the transmission telephone number (step S104). For example, a call charge "5000" is stored into the billing management database 13*b* by associating the call charge with the local telephone number "0901234568" and a transmission telephone number "0311112222".

On the other hand, when receiving only a transmission request (for example, "0112345678") to designate the telephone number of the receiver terminal 30 as a destination (step S101), the telephone number of the sender terminal 20 (for example, "09012345678") is transmitted directly to the receiver terminal 30 as a sender telephone number as an ordinary call. After the call is finished, a call charge is stored into the billing management database 13*b* by associating the call charge with the local telephone number to bill the sender terminal 20.

The telephone number of the sender terminal 20 and the telephone number of the transmission telephone number terminal 50 are stored by associating each other. From the sender terminal 20, received is a transmission request alone to designate the telephone number of the receiver terminal 30 as a receiver telephone number, or the transmission request together with a billing request to bill the transmission telephone number terminal 50. When receiving only the transmission request, the transmission request is controlled with the telephone number of the sender terminal 20 as a sender telephone number. When receiving the transmission request together with the billing request, by acquiring the stored telephone number of the transmission telephone number terminal 50 associated with the sender terminal 20, the transmission request is controlled with the telephone number of the transmission telephone number terminal 50 as a sender telephone number. The transmission request controlled with the telephone number of the sender terminal 20 as the sender telephone number is controlled so as to bill the sender terminal 20 for a communication charge for the transmission request, while the transmission request controlled with the telephone number of the transmission telephone number terminal 50 as the sender telephone number is controlled so as to bill the transmission telephone number terminal 50 for a communication charge for the transmission request. Accordingly, as a principal characteristic, telephone number of the sender terminal 20 is not presented to a counterpart, so that leakage of personal information can be prevented. Moreover, no destination is required to be registered in advance, thereby operation of the system can be started promptly.

The present invention can be applied to different variations other than examples according to the first embodiment.

According to the first embodiment, a case is explained in which the communication control apparatus 10 receives a transmission request from the sender terminal 20. However, the present invention is not limited to this, the communication control apparatus 10 can also receive a transmission request from the receiver terminal 30 to designate the telephone number of the transmission telephone number terminal 50 as a receiver telephone number. Namely, explained is a case where the communication control apparatus 10 receives receiver designation of a transmission number (corresponding to a "transmission request" and a "transferring request"), from the receiver terminal 30.

Figure 6:
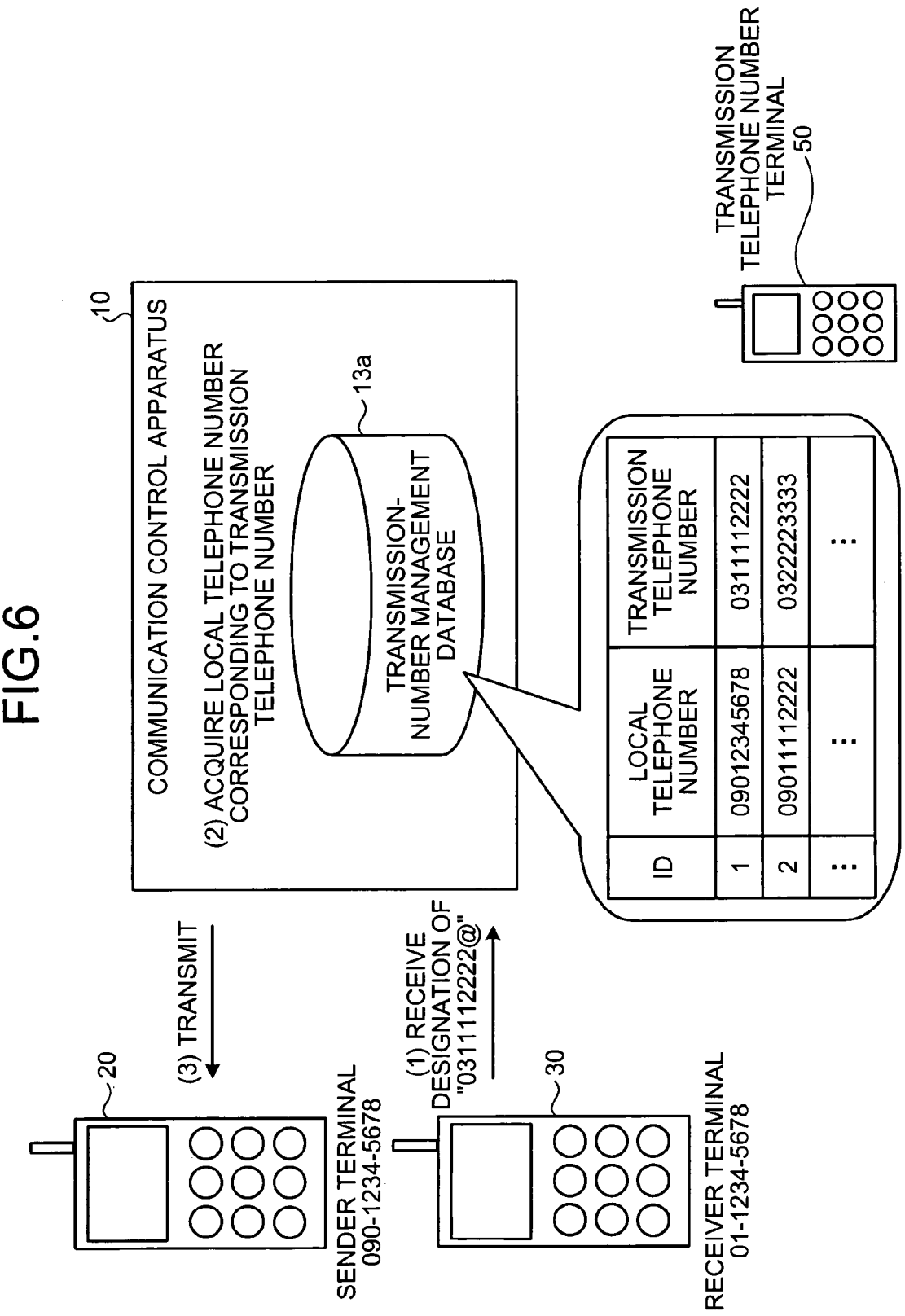
FIGS. 6 to 8 are schematics for illustrating an outline and features of a communication control apparatus according to a second embodiment of the present invention.

FIG. 6 is a schematic for illustrating an outline and features of a communication control apparatus according to a second embodiment of the present invention. When receiving receiver designation of a transmission number (for example, "0311112222@") from the receiver terminal 30, which combines a transmission request and a transferring request (for example, "@") to designate the sender terminal 20 as a transfer destination (see FIG. 6, (1)), the communication control apparatus 10 acquires the local telephone number from the transmission-number management database 13*a* based on the transmission telephone number of the transmission telephone number terminal 50 as a searching key (see FIG. 6, (2)). For example, when receiving receiver designation of a transmission number from the receiver terminal 30, the communication control apparatus 10 acquires the local telephone number "0901234568" corresponding to a transmission telephone number "0311112222" from the transmission-number management database 13*a*. The communication control apparatus 10 then transmits to the sender terminal 20 (see FIG. 6, (3)). When receiving only a transmission request without transferring request (for example, "0311112222"), the communication control apparatus 10 transmits as an ordinary call, similarly to the first embodiment.

Thus, from the receiver terminal 30, received is a transmission request alone to designate the telephone number of the transmission telephone number terminal 50 as a receiver telephone number, or the transmission request together with a transferring request to designate the sender terminal 20 as a transfer destination. When receiving only the transmission request, the transmission request is controlled with the telephone number of the transmission telephone number terminal 50 as a receiver telephone number. When receiving the transmission request together with the transferring request, by acquiring the stored telephone number of the sender terminal 20 associated with the transmission telephone number terminal 50, the transmission request is controlled with the telephone number of the sender terminal 20 as a receiver telephone number. Accordingly, the sender terminal 20 can receive a call without exposure of the telephone number of the sender terminal 20, so that leakage of personal information can be prevented.

In addition, with this invention, a unique ID (corresponding to "terminal identification information") can be used, which is stored by making an association with a local telephone number and the transmission telephone number for uniquely identifying a local terminal. Namely, using unique IDs, the single transmission telephone number can be associated with local telephone numbers.

Specifically, as shown in FIG. 9, the transmission-number management database 13*a* provided in the communication control apparatus 10 associates an "ID", a "local telephone number", and the "transmission telephone number" with a "unique ID" as terminal identification information for uniquely identifying a local terminal, and stores them. After receiving sender designation of a transmission number (for example, "@0112345678"), which combines a transmission request and a billing request (for example, "@") to bill the transmission telephone number terminal 50, from the sender terminal 20 (see FIG. 7, (1)), the communication control apparatus 10 acquires the transmission telephone number together with a unique ID from the transmission-number management database 13*a* based on a local telephone number of the sender terminal 20 as a searching key (see FIG. 7, (2)). For example, when receiving sender designation of a transmission number from the sender terminal 20, the communication control apparatus 10 acquires the transmission telephone number "0311112222" and a unique ID "001" corresponding to a local telephone number "0901234568", from the transmission-number management database 13*a*.

Figure 7:
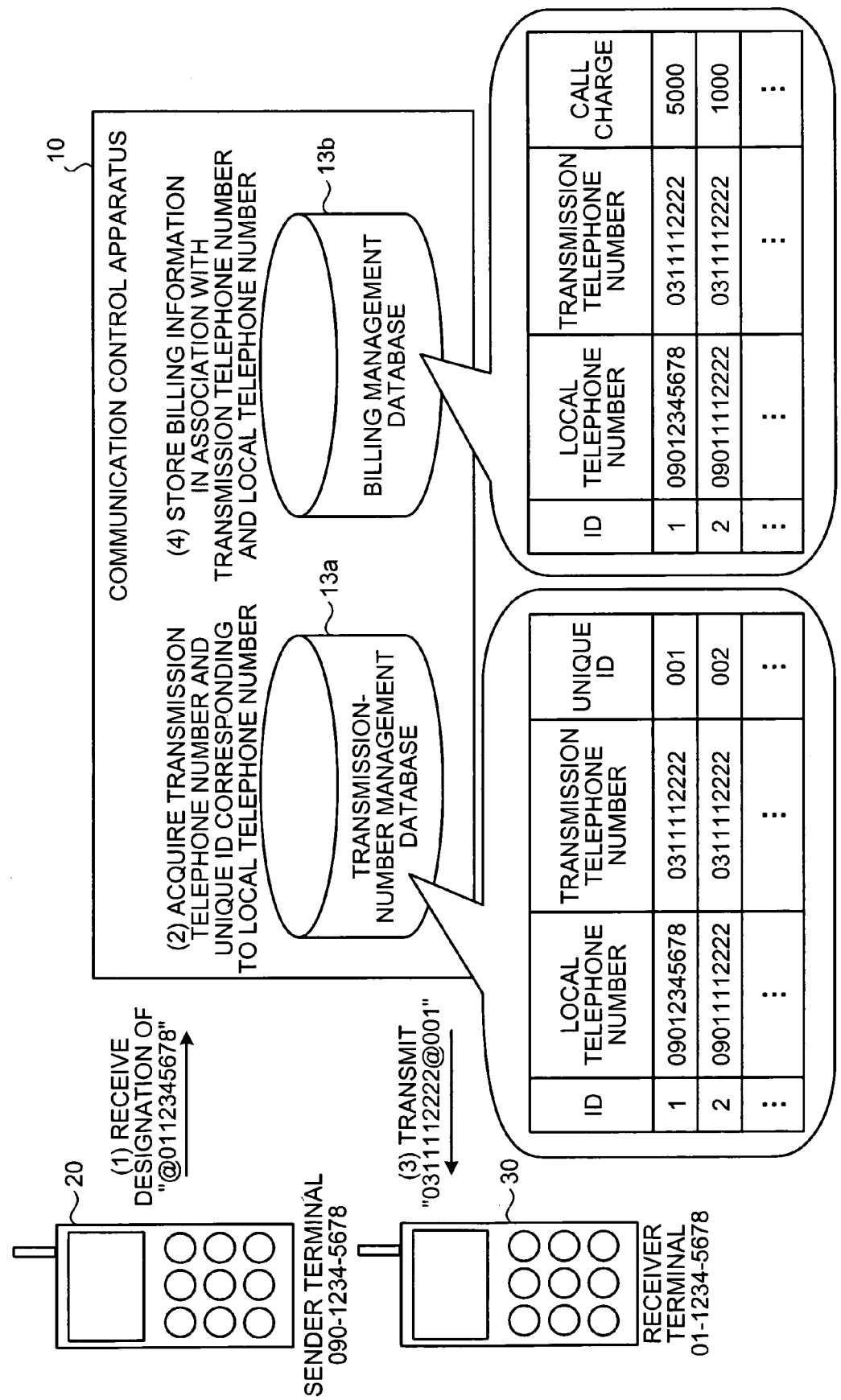

The communication control apparatus 10 then transmits designation of the transmission telephone number for the receiver (for example, 0311112222@001), which combines the transmission telephone number, a transmission telephone number character and the unique ID, as a sender telephone number to the receiver terminal 30 (see FIG. 7, (3)). After a call by the transmission is finished, the communication control apparatus 10 stores a call charge into the billing management database 13b by associating the call charge with the transmission telephone number and the local telephone number (see FIG. 7, (4)), similarly to the first embodiment, to bill the transmission telephone number. For the above example, the communication control apparatus 10 stores a call charge "5000" into the billing management database 13b by associating the call charge with the local telephone number "0901234568" and the transmission telephone number "0311112222".

Figure 8:
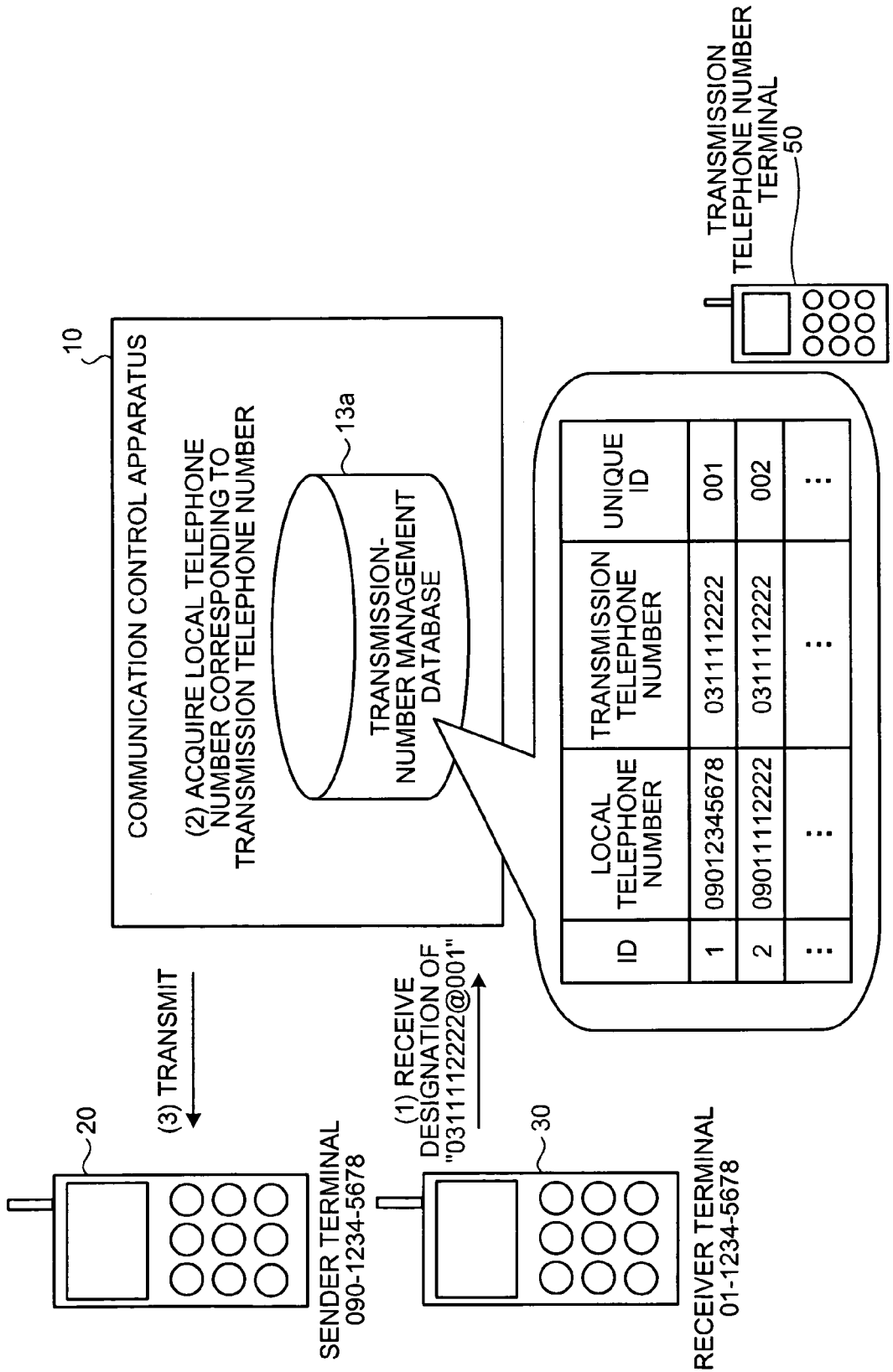

Next, as shown in FIG. 8, a case is explained in which the communication control apparatus 10 receives receiver designation of a transmission number (corresponding to a "transmission request", a "transferring request", and "terminal identification information") from the receiver terminal 30.

When receiving receiver designation of a transmission number (for example, "0311112222@001") from the receiver terminal 30, which combines a transmission request, a transferring request to designate the sender terminal 20 as a transfer destination, and a unique ID (see FIG. 8, (1)), the communication control apparatus 10 acquires a local telephone number from the transmission-number management database 13a based on the transmission telephone number of the transmission telephone number terminal 50 and a unique ID as a searching key (see FIG. 8, (2)). For example, when receiving receiver designation of a transmission number from the receiver terminal 30, the communication control apparatus 10 acquires the transmission telephone number "0311112222" and a local telephone number "0901234568" corresponding to a unique ID "001" from the transmission-number management database 13a. The communication control apparatus 10 then transmits to the sender terminal 20 (see FIG. 8, (3)).

Thus, by making an association with the telephone number of the transmission telephone number terminal 50, each telephone number of a plurality of sender terminals 20 and terminal identification information for uniquely identifying the sender terminals 20 are stored. A transmission request to designate the telephone number of the transmission telephone number terminal 50 as a receiver telephone number is received together with a transferring request to designate the sender terminal 20 as a transfer destination and terminal identification information corresponding to one of the sender terminals 20. When receiving the transmission request together with the transferring request and the terminal identification information, by acquiring a stored telephone number of the sender terminal 20 associated with the telephone number of the transmission telephone number terminal 50 and the terminal identification information, the transmission request is controlled with the telephone number of the sender terminal 20 as a receiver telephone number. Accordingly, a plurality of accounts of the sender terminals 20 to be billed can be consolidated into a single account of the transmission telephone number terminal 50.

According to the present invention, by storing operational periods and/or effective period, a billing request can be controlled so as to bill the transmission telephone number terminal 50 only within the operational periods and/or the effective period. In the following description, explained is a case where operational periods and effective period are stored so that a billing request is processed only within the operational periods and the effective period, however, a billing request can be controlled so as to be processed within either the operational periods or the effective period, by storing either the operational periods or the effective period.

Specifically, as shown in FIG. 11, the communication control apparatus 10 is provided with the transmission-number management database 13a that stores operational periods applicable to respond to billing request(s) and effective period allowable for billing request(s), as well as the "ID", the "local telephone number", and the "transmission telephone number", by associating one another.

Figure 10:
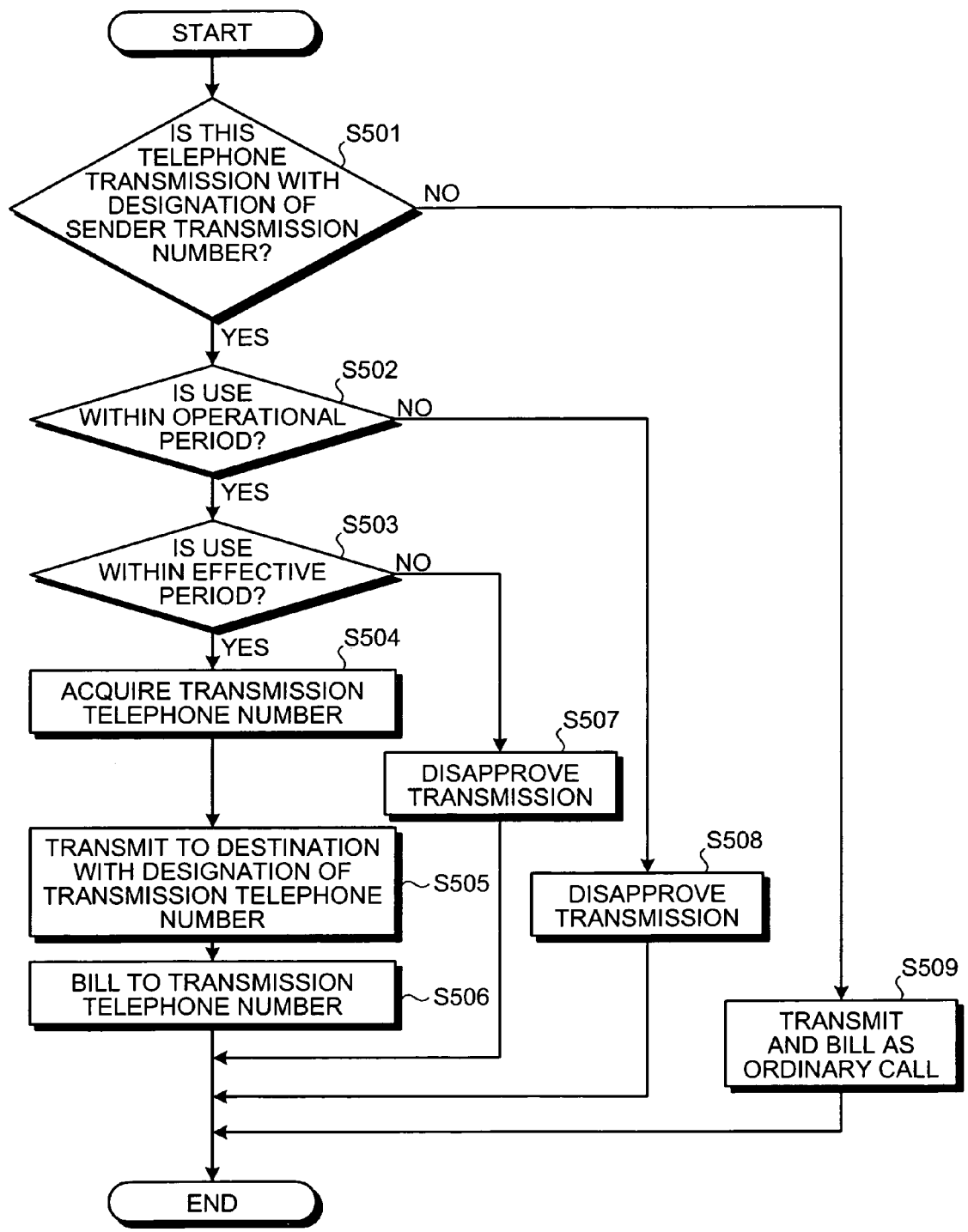
FIG. 10 is a flowchart of a processing procedure for a transmission control process according to the second embodiment.

As shown in FIG. 10, after the receiving unit 12a receives sender designation of a transmission number from the sender terminal 20 (step S501, Yes), the communication control apparatus 10 determines whether it is a use within the operational period (step S502), and when the use is not within the operational period (step S502, No), transmission disapproval is notified to the sender terminal 20 (step S507). On the other hand, when the use is within the operational period (step S502, Yes), the communication control apparatus 10 determines whether the use is within the effective period (step S503), and when the use is not within the effective period (step S503, No), transmission disapproval is notified to the sender terminal 20 (step S508). On the other hand, when the use is within the effective period (step S503, Yes), processing similarly to the first embodiment is carried out (steps S504 to S506).

Thus, information indicating an operational period applicable to respond to a billing request is stored by making an association with the sender terminal 20 and the telephone number of the transmission telephone number terminal 50. When receiving a transmission request together with a billing request, the transmission request is controlled, provided that the operational period is satisfied. Accordingly, any unqualified access out of the service operational period to bill the transmission telephone number terminal 50 can be prevented.

In addition, by making an association with the sender terminal 20 and the telephone number of the transmission telephone number terminal 50, information indicating effective period allowable for a billing request is stored. When receiving a transmission request together with a billing request, the transmission request is controlled, provided that the effective period is satisfied. Accordingly, any unqualified access out of the service hours to bill the transmission telephone number terminal 50 can be prevented.

According to the present invention, by receiving an editing request for one or a plurality of items stored in the transmission-number management database 13a including a local telephone number, a transmission telephone number, a unique ID, an operational period, and effective period, one or more of the items can be edited in response to the editing request. Furthermore, by certifying whether the editing request is requested by a qualified user, the editing request can be approved, provided that it is certified that the editing request is requested by a qualified user. Alternatively, editing can be approved without certifying process.

Thus, an editing request is received for one or more of the stored items including a telephone number of the sender terminal 20, a telephone number of the transmission telephone number terminal 50, terminal identification information of the sender terminal 20, an operational period, and effective period. In response to a received editing request, one or more of the stored items including a telephone number of the sender terminal 20, a telephone number of the transmission telephone number terminal 50, terminal identification information of the sender terminal 20, an operational period, and effective period is/are edited. Accordingly, processing can flexibly respond to a case where a local telephone number needs to be changed due to replacement purchase of a telephone number or the likes.

Furthermore, by certifying whether the received editing request is requested by a qualified user, one or more of the stored items including a telephone number of the sender terminal 20, a telephone number of the transmission telephone number terminal 50, terminal identification information of the sender terminal 20, an operational period, and effective period is/are edited, provided that it is certified that the editing request is requested by a qualified user. Accordingly, malicious replacement of a transmission telephone number, unqualified editing of transmission telephone number information, or the likes can be prevented.

Illustrated each component of each unit provides functional concepts, and is not necessarily to be physically configured as shown in the figures. Namely, practical forms of segmentation and integration of each component are not limited to the drawings, and each component, in whole or in part, can be configured by any unit by segmenting and integrating functionally or physically according to different loads and operational conditions. For example, the receiving unit 12a and the acquiring unit 12b can be integrated. Furthermore, each processing function performed in each unit, in whole or in any part, can be achieved by a central processing unit (CPU) and program(s) that the CPU analyzes and executes, or can be materialized as hardware by wired-logic.

Among processing procedures explained in the present embodiment, a procedure that is explained to be automatically carried out can be manually carried out in whole or in part, on the contrary, a procedure that is explained to be manually carried out can be automatically carried out in whole or in part. In addition, regarding processing procedures, control procedures, specific names, and information containing different data and items that are described in the above description and in the drawings, any of those can be changed unless otherwise specified.

Figure 12:
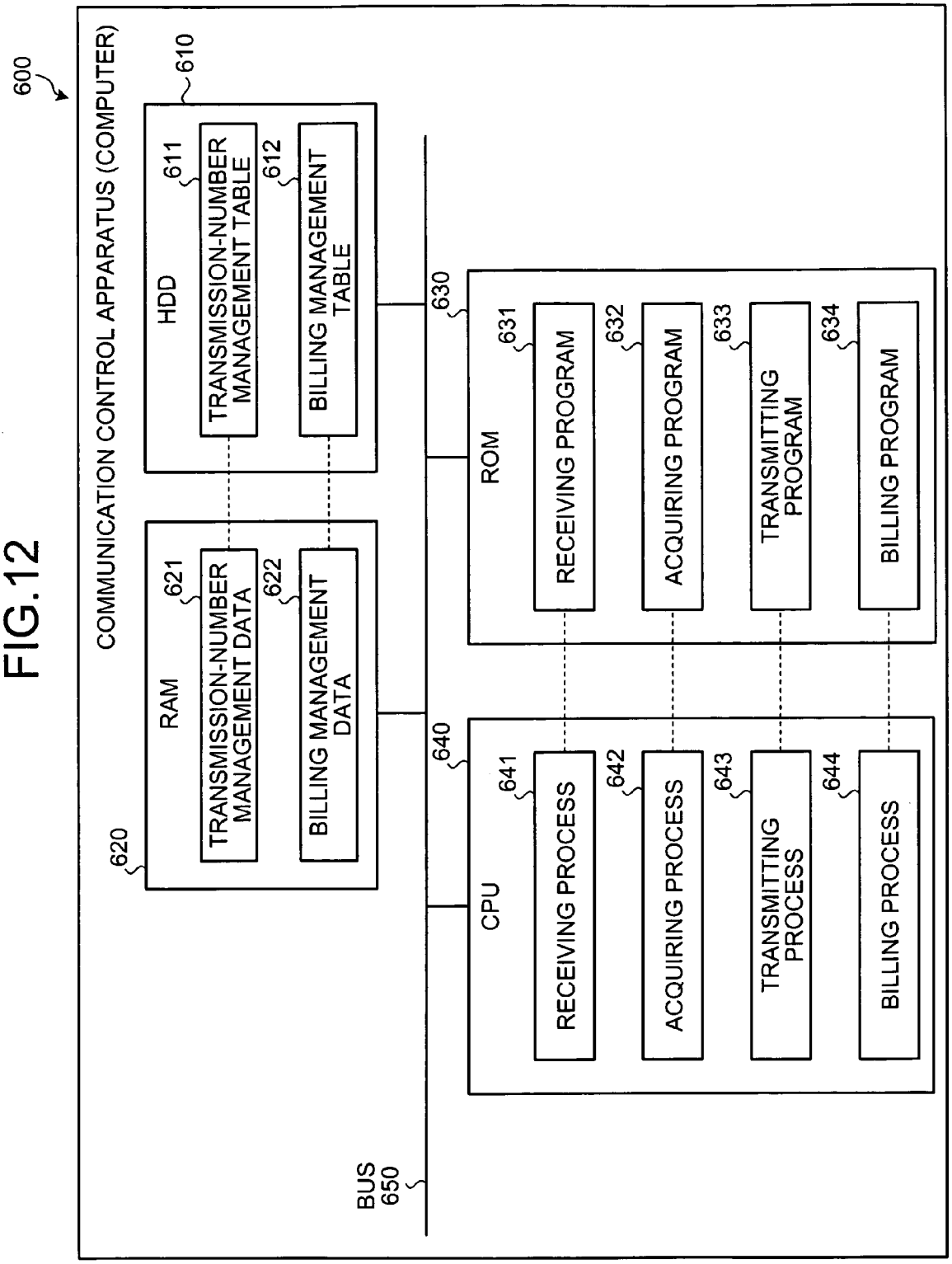
FIG. 12 is a block diagram of a computer that performs as the communication control apparatus.

The processing procedures explained in the embodiment described above can be implemented by executing program (s) provided in advance. An example of a computer that executes program(s) that has functions similar to the embodiment described above is explained below with reference to FIG. 12. FIG. 12 is a block diagram of a computer 600 that performs as the communication control apparatus.

The computer 600 as a communication control apparatus is configured by connecting a hard disk (HDD) 610, a random access memory (RAM) 620, a read only memory (ROM) 630, and a CPU 640 one another via a bus 650.

As shown in a communication control apparatus that performs similarly to the embodiment described above, i.e. FIG. 12, in the ROM 630, a receiving program 631, an acquiring program 632, a transmitting program 633, and a billing program 634 are stored in advance. The programs 631 to 634 can be expediently integrated or segmented, similarly to each component of the communication control apparatus shown in FIG. 2.

The CPU 640 then reads out the programs 631 to 634 from the ROM 630 and executes them, so that, as shown in FIG. 12, the programs 631 to 634 can perform as a receiving process 641, an acquiring process 642, a transmitting process 643, and a billing process 644, respectively. The processes 641 to 644 correspond to the receiving unit 12a, the acquiring unit 12b, the transmitting unit 12c, and the billing unit 12d, shown in FIG. 2, respectively.

As shown in FIG. 12, the HDD 610 is provided with a transmission-number management table 611 and a billing management table 612. The transmission-number management table 611 and the billing management table 612 correspond to the transmission-number management database 13a and the billing management database 13b shown in FIG. 2, respectively. The CPU 640 registers data into the transmission-number management table 611 and the billing management table 612, reads out transmission-number management data 621 and billing management data 622 from the transmission-number management table 611 and the billing management table 612 to store them into the RAM 620, and executes processing that manages location information based on the transmission-number management data 621 and the billing management data 622 stored in the RAM 620.

According to the present invention, a terminal number of a first communication terminal and a terminal number of a further second communication terminal are stored by associating each other. From the first communication terminal, received is a transmission request alone to designate a terminal number of a third communication terminal as a receiver terminal number, or the transmission request together with a transmission control request to designate the terminal number of the second communication terminal as a sender terminal number. When receiving only the transmission request, the transmission request is controlled with the terminal number of the first communication terminal as a sender terminal number. When receiving the transmission request together with the transmission control request, the transmission request is controlled with the terminal number of the second communication terminal as a sender terminal number, by acquiring a stored terminal number of the second communication terminal associated with the first communication terminal. Accordingly, the terminal number of the first communication terminal (for example, telephone number) is not presented to a counterpart, so that leakage of personal information can be prevented. Moreover, no destination is required to be registered in advance, thereby operation of the system can be started promptly.

Furthermore, according to the present invention, from the third communication terminal, received is a transmission request alone to designate the terminal number of the second communication terminal as a receiver terminal number, or the transmission request together with a transferring request to designate the first communication terminal as a transfer destination. When receiving only the transmission request, the transmission request is controlled with the terminal number of the second communication terminal as a receiver terminal number. When receiving the transmission request together with the transferring request, the transmission request is controlled with the terminal number of the first communication terminal as a receiver terminal number, by acquiring a stored terminal number of the first communication terminal associated with the second communication terminal. Accordingly, the first communication terminal can receive a call without exposure of terminal number of the first communication terminal, so that leakage of personal information can be prevented.

Moreover, according to the present invention, by making an association with the terminal number of the second communication terminal, stored are each terminal number of a plurality of first communication terminals and terminal identification information for uniquely identifying the first communication terminals. A transmission request to designate the terminal number of the second communication terminal as a receiver terminal number is received together with a transferring request to designate the first communication terminal as a transfer destination, and terminal identification information corresponding to one of the first communication terminals. When receiving the transmission request together with the transferring request and the terminal identification information, by acquiring a stored terminal number of the first communication terminal associated with the terminal number of the second communication terminal and the terminal identification information, the transmission request is controlled with the terminal number of the first communication terminal as a receiver terminal number. Accordingly, a plurality of accounts of the first communication terminals to be billed can be consolidated into a single account of the second communication terminal.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication control apparatus comprising:
   a terminal-number storing unit that stores a terminal number and a substitute terminal number for the terminal number in a corresponding manner;
   a transmission-request receiving unit that receives, from a sender terminal, a first transmission request for communicating with a receiver terminal, and a second transmission request including the first transmission request and a request that a terminal number for the sender terminal is to be substituted by other terminal number;
   a terminal-number acquiring unit that acquires the substitute terminal number corresponding to the terminal number for the sender terminal from the terminal-number storing unit when the transmission-request receiving unit receives the second transmission request; and
   a transmission-request control unit that
      transmits the substitute terminal number acquired to the receiver terminal to establish a communication between the sender terminal and the receiver terminal.

2. The communication control apparatus according to claim 1, further comprising:
   a billing control unit that controls a billing of a communication charge in such a manner that a billing for the second transmission request is charged to a communication terminal for the substitute terminal number.

3. The communication control apparatus according to claim 1, wherein
   the transmission-request receiving unit further receives, from the receiver terminal, a terminal number transmitted to the receiver terminal, a third transmission request for communicating with a communication terminal for the transmitted terminal number, and a fourth request including both the third transmission request and a request that the transmitted number is to be substituted by other terminal number,
   the terminal number acquiring unit further acquires the terminal number corresponding to the transmitted terminal number from the terminal-number storing unit when the transmission-request receiving unit receives the fourth transmission request, and
   the transmission-request control unit
      establishes a communication between the receiver terminal and the communication terminal for the terminal number acquired.

4. The communication control apparatus according to claim 1, wherein
   the terminal-number storing unit further stores terminal numbers for a plurality of the sender terminals and terminal identification information for uniquely identifying each of the sender terminals, in association with the substitute terminal number,
   the transmission-request receiving unit receives, from the receiver terminal, the transmitted terminal number, the fourth transmission request with the terminal identification information corresponding to one of the sender terminals,
   the terminal-number acquiring unit further acquires a terminal number for the sender terminal number corresponding to both the transmitted terminal number and the terminal identification information from the terminal-number storing unit when the transmission-request receiving unit receives the fourth transmission request with the terminal identification information,
   and
   the transmission-request control unit establishes a communication between the receiver terminal and the sender terminal for the terminal number acquired.

5. The communication control apparatus according to claim 1, wherein
   the terminal-number storing unit further stores information indicating an operational period applicable to respond to a billing request, in association with the terminal number and the substitute terminal number, and
   when the transmission-request receiving unit receives the first transmission request and the second transmission request together with the billing request, the transmission-request control unit transmits the substitute terminal number acquired to the receiver terminal to establish the communication between the sender terminal and the receiver terminal, the transmission request control unit transmits the substitute terminal number acquired to the receiver terminal to establish the communication between the sender terminal and the receiver terminal, provided that the operational period is valid.

6. The communication control apparatus according to claim 1, wherein
   the terminal-number storing unit further stores information indicating effective period in which the billing request is usable, in association with the terminal number and the substitute terminal number, and
   when the transmission-request receiving unit receives the first transmission request and second transmission request together with the billing request, the transmission-request control unit transmits the substitute terminal number acquired to the receiver terminal to establish the communication between the sender terminal and the receiver terminal, the transmission request control unit transmits the substitute terminal number acquired to the receiver terminal to establish the communication between the sender terminal and the receiver terminal, provided that the effective period is valid.

7. The communication control apparatus according to claim 1, further comprising:
   an editing-request receiving unit that receives an editing request for one or a plurality of items from among the terminal number, the substitute terminal number, the terminal identification information for the sender terminal, the operational period, and the effective period stored in the terminal-number storing unit; and
   an editing unit that edits the one or a plurality of items in response to the editing request received by the editing-request receiving unit.

8. The communication control apparatus according to claim 7, further comprising:
   a certifying unit that certifies whether the editing request is from a qualified user, wherein
   the editing unit edits the one or a plurality of items, provided that the certifying unit certifies that the editing request is from the qualified user.

9. A method of controlling a terminal number for a sender terminal, the method comprising:
> storing a terminal number and a substitute terminal number in a corresponding manner;
> receiving, from a sender terminal, a transmission request for communicating with a receiver terminal, and a second transmission request including both the first transmission request and a request that a terminal number for the sender terminal is to be substituted by other terminal number;
> acquiring the substitute terminal number corresponding to the terminal number for the sender terminal from the storing when the receiving receives the second transmission request; and
> transmitting the substitute terminal number acquired to the receiver terminal to establish the communication between the sender terminal and the receiver terminal.

10. A computer-readable recording medium that stores a computer program for controlling a sender terminal number, wherein the computer program causes a computer to execute:
> storing a first terminal number and a substitute terminal number in a corresponding manner;
> receiving, from a sender terminal, a transmission request for communicating with a receiver terminal, and a second transmission request including the first transmission request and a request that a terminal number for the sender terminal is to be substituted by other terminal number;

acquiring the substitute terminal number corresponding to the terminal number for the sender terminal from the storing when the receiving receives the second transmission request; and transmitting the substitute terminal number acquired to the receiver terminal to establish the communication between the sender terminal and the receiver terminal.

* * * * *